(12) United States Patent
Hill et al.

(10) Patent No.: US 8,013,259 B2
(45) Date of Patent: Sep. 6, 2011

(54) MULTI POSITION DIVIDER CLIP

(75) Inventors: Raymond M. Hill, Plainfield, IL (US);
Richard L. Harper, Frankfort, IL (US);
Robert T. Fitzpatrick, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 572 days.

(21) Appl. No.: 12/137,028

(22) Filed: Jun. 11, 2008

(65) Prior Publication Data

US 2009/0308654 A1 Dec. 17, 2009

(51) Int. Cl.
*H02G 3/04* (2006.01)
(52) U.S. Cl. ......... 174/481; 174/68.1; 174/95; 174/70 R
(58) Field of Classification Search .................. 174/480, 174/481, 68.1, 68.3, 72 C, 97, 99 R, 70 R, 174/72 R, 95; 52/220.1, 220.3, 220.5, 220.7; 220/3.8, 4.02; 439/536–539, 211, 207
See application file for complete search history.

(56) References Cited

U.S. PATENT DOCUMENTS

| | | | |
|---|---|---|---|
| 5,879,185 A * | 3/1999 | Handler et al. ............... | 439/538 |
| 5,995,699 A | 11/1999 | Vargas et al. | |
| 6,002,089 A | 12/1999 | Hemingway et al. | |
| 6,188,024 B1 | 2/2001 | Benito-Navazo | |
| 6,344,611 B2 | 2/2002 | Ewer et al. | |
| 6,362,420 B1 | 3/2002 | Bacouelle et al. | |
| 6,380,486 B1 | 4/2002 | Hemingway et al. | |
| 6,476,327 B1 | 11/2002 | Bernard et al. | |
| 6,478,499 B1 | 11/2002 | Fugman et al. | |
| 6,756,544 B2 | 6/2004 | Handler | |
| 6,909,044 B2 | 6/2005 | Ewer et al. | |
| 6,936,766 B1 | 8/2005 | Galasso | |
| 6,938,337 B2 | 9/2005 | Ewer et al. | |
| 6,972,367 B2 * | 12/2005 | Federspiel et al. ........... | 174/68.3 |
| 7,009,108 B2 * | 3/2006 | Vargas et al. ................ | 174/68.3 |
| 7,045,707 B1 | 5/2006 | Galasso | |
| 7,223,925 B2 | 5/2007 | Ewer et al. | |
| 7,262,371 B2 | 8/2007 | Makwinski et al. | |
| 7,544,900 B2 * | 6/2009 | Makwinski et al. ......... | 174/68.3 |
| 7,635,812 B2 * | 12/2009 | Cardi ........................... | 174/68.3 |

OTHER PUBLICATIONS

Hubbell Inc. 4000 Series Metal Raceway catalog p. 30, date unknown.
Hubbell Inc. 6750 Series Metal Raceway catalog p. 38, date unknown.

* cited by examiner

*Primary Examiner* — Angel R Estrada
(74) *Attorney, Agent, or Firm* — Robert A. McCann; Christopher S. Clancy; Aimee E. McVady

(57) ABSTRACT

The present invention is directed toward a divider clip that holds a divider wall in a multi-channel raceway. The divider clip includes a base and sidewalls extending from ends of the base. The divider clip also includes removable clip fingers that extend from the base. One of the removable clip fingers is located at the center of the base while a second removable clip finger is located closer to one of the sidewalls. One of the clip fingers is removed from the divider clip to enable the remaining clip finger to hold to divider wall to separate the raceway into either a 50/50 channel split, a 60/40 channel split or a 40/60 channel split.

20 Claims, 12 Drawing Sheets

MULTI POSITION DIVIDER CLIP

FIELD OF THE INVENTION

The present invention relates to a multi-channel raceway system, and more particularly to a divider clip installed in a multi-channel metal raceway to hold a divider wall in a plurality of locations.

BACKGROUND OF THE INVENTION

Metal raceways are used to route power wiring or communication cable along surfaces such as walls, floors, ceilings or on other fixed structures. Raceways provide a convenient way to manage electrical wiring for multiple circuits and/or communication cables while keeping them out of sight and eliminate the physical and network dangers associated with exposure. The metal raceways thus provide an aesthetic and easy way to route wiring or cables from a power source or network entrance to a desired location.

The power and communication cables must be routed in separate channels in the raceway. As a result, a divider wall divides the raceway to form and maintain multiple channels to accommodate the power and communication cables. Often the amount or size of the cables requires the capacity of one of the channels to be larger than another. Prior metal raceways include a divider clip with at least one slot designed to receive a removable generally L-shaped clip. The L-shaped clip is inserted in the slot to support a divider wall to divide a raceway into various sized channels. The divider clip, however, does not support a divider wall in a plurality of locations.

Therefore, there is a need for a divider clip that is easily installed in a raceway to support a divider wall in a plurality of locations.

SUMMARY OF THE INVENTION

The present invention is directed towards a divider clip in a multi-channel metal raceway. The divider clip holds a divider wall in the multi-channel raceway in a plurality of locations. The divider clip includes a base, sidewalls extending from ends of the base and removable clip fingers. Two removable clip fingers extend from the base. One of the removable clip fingers is located at the center of the base while the other removable clip finger is located closer to one of the sidewalls. One of the clip fingers is removed from the divider clip before the divider clip is installed in the raceway. The remaining clip finger holds the divider wall to separate the raceway into either a 50/50 channel split, a 60/40 channel split or a 40/60 channel split.

DETAILED DESCRIPTION

Figure 1:
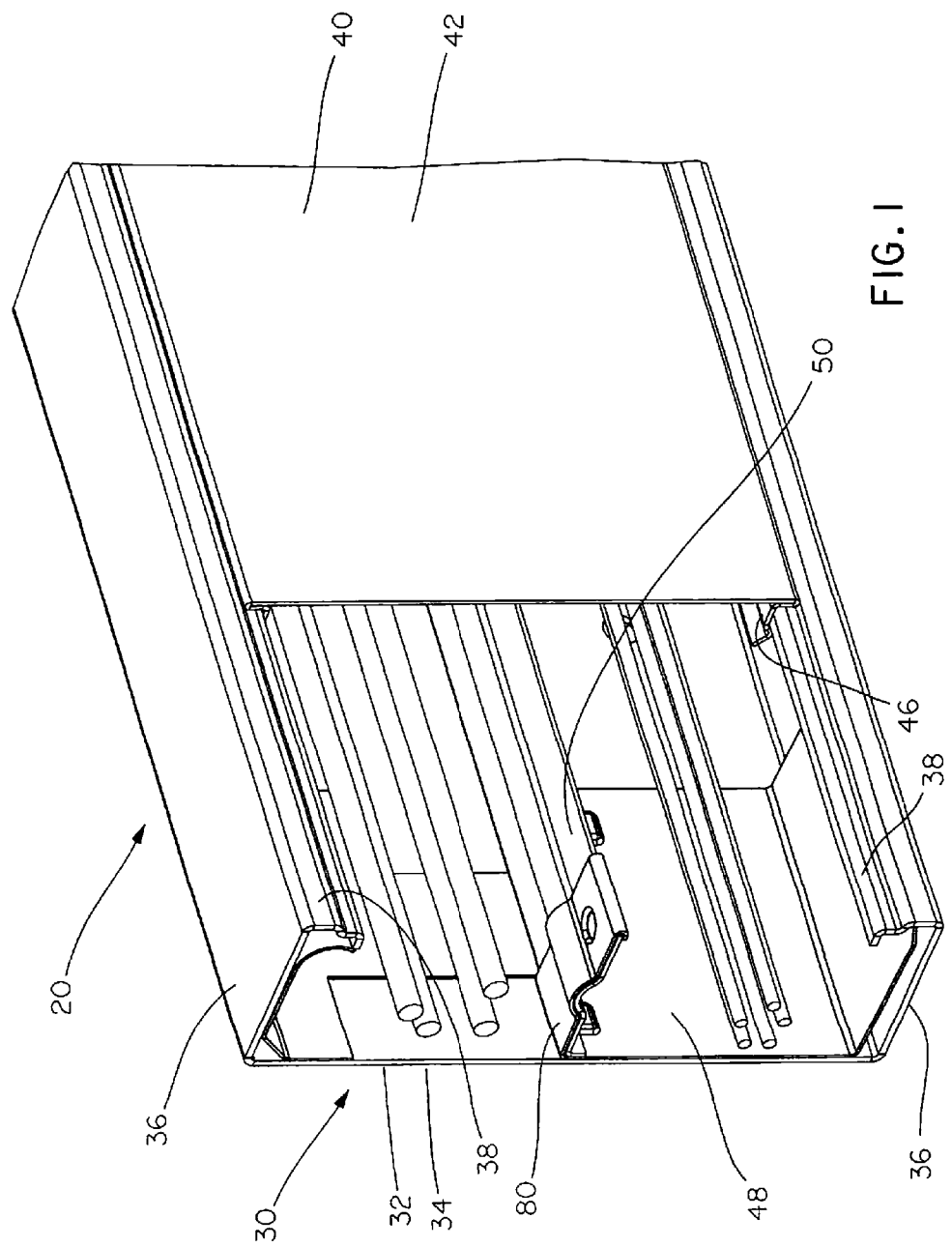
FIG. 1 is a perspective view of a multi-channel metal raceway system with a divider clip of the present invention.

FIG. 1 illustrates a multi-channel metal raceway system 20 with a divider clip 80 of the present invention. The multi-channel metal raceway 30 is illustrated and described in commonly owned U.S. Patent Application Publication No. 2007/0044987A1, the contents of which are herein incorporated by reference.

The multi-channel metal raceway 30 includes a base 32 with a bottom wall 34 and sidewalls 36. Each sidewall 36 includes a flange 38. The multi-channel metal raceway 30 also includes a cover 40 with a top wall 42 and flanges 46 extending from each end of the top wall 42. The flanges 46 of the cover 40 matingly engage the flanges 38 of the raceway base 32. When the cover 40 is installed over the base 32, a channel 48 is formed for routing cables in the raceway 30.

Figure 2:
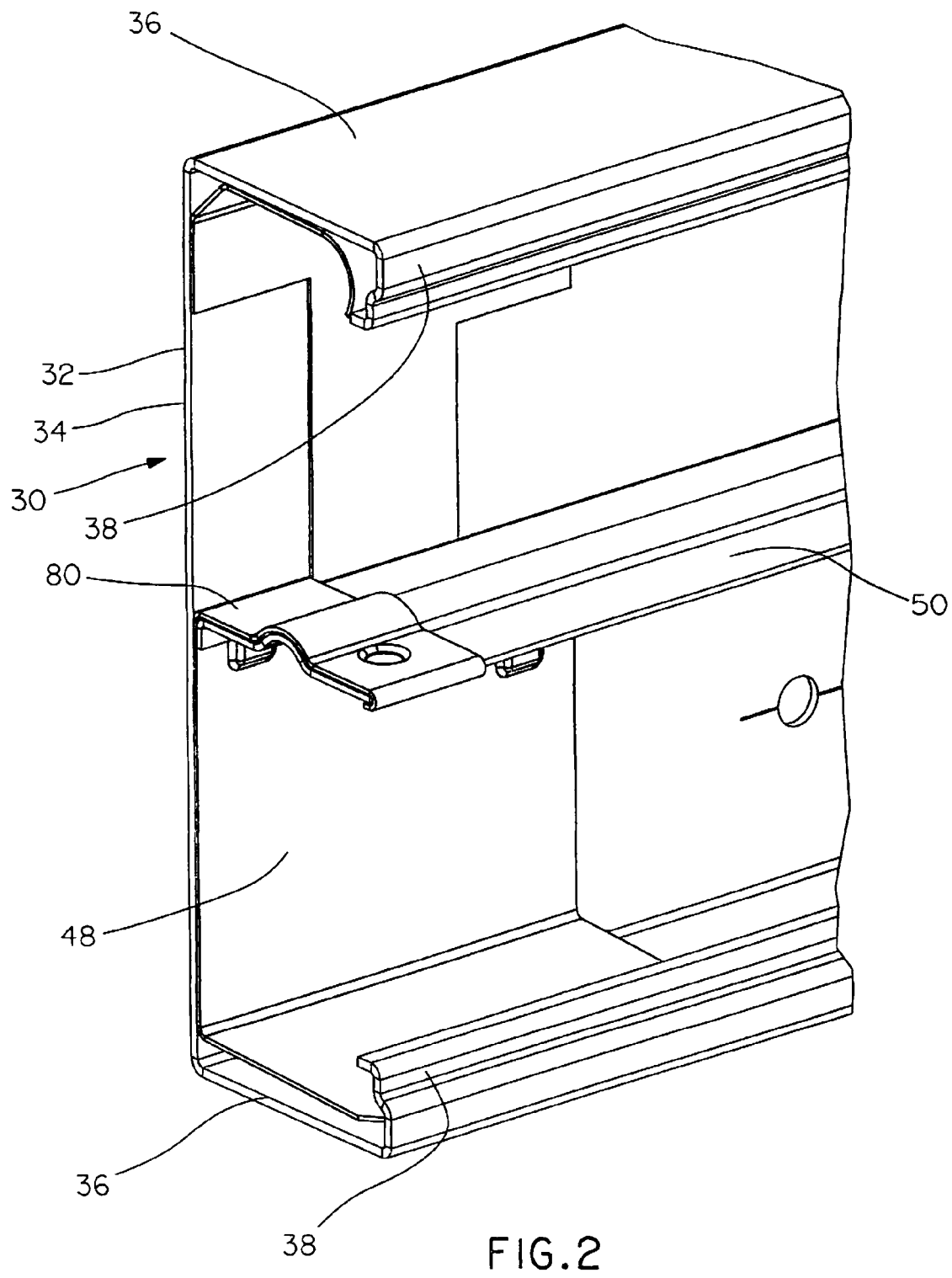
FIG. 2 is a left perspective view of the multi-channel metal raceway system with the cover removed and with the divider clip of FIG. 1.
Figure 3:
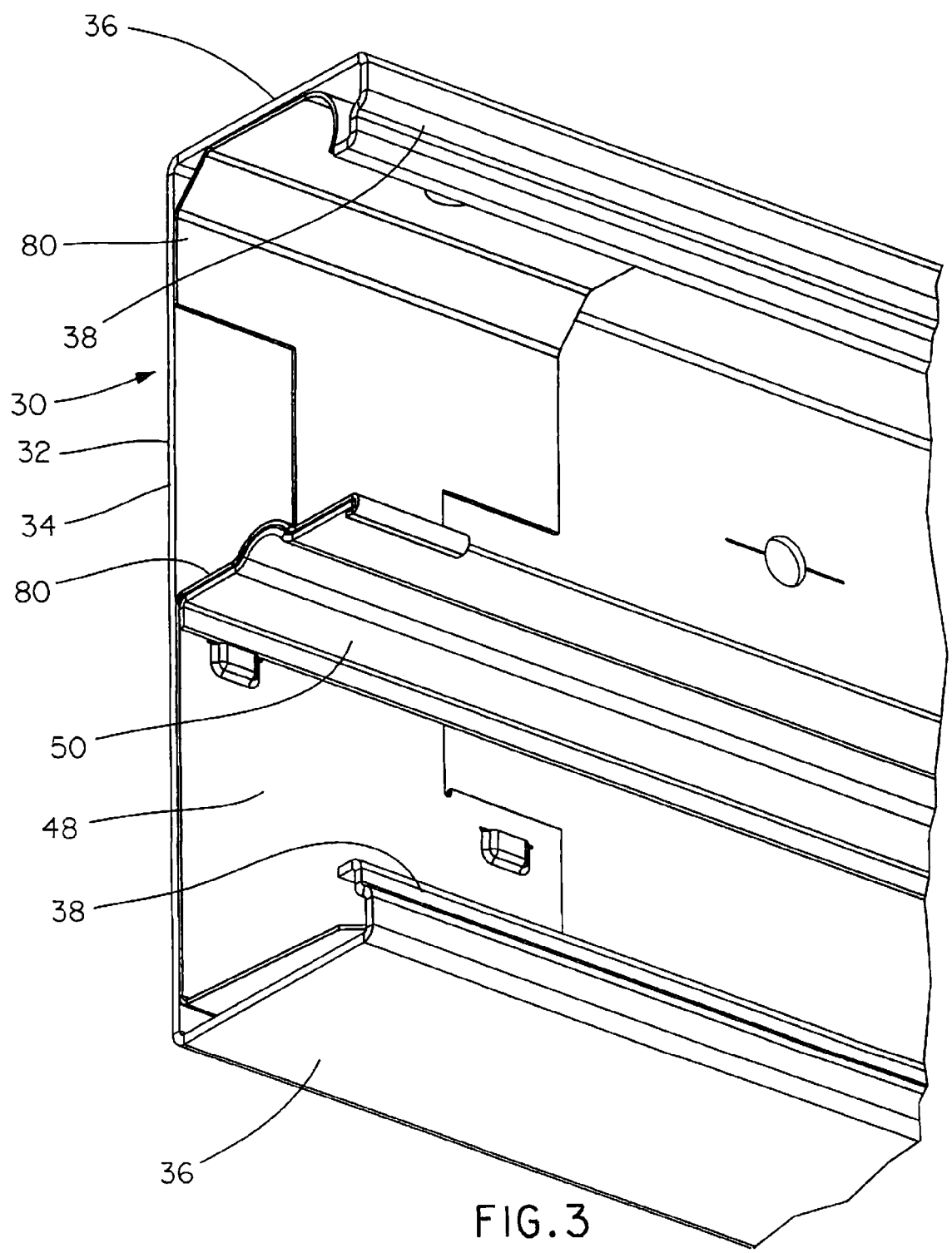
FIG. 3 is a right perspective view of the multi-channel metal raceway system with the cover removed and with the divider clip of FIG. 1.

FIGS. 1-3 illustrate the multi-channel metal raceway 30 with a divider clip 80 and a divider wall 50 installed in the channel 48. The divider clip 80 secures the divider wall 50 to divide the raceway 30 into two channels. The divider clip 80 holds the divider wall 50 in one of three locations, allowing the raceway to be divided into a 50/50 split (FIG. 10), a 60/40 split (FIG. 11) or a 40/60 split (FIG. 12).

Figure 4:
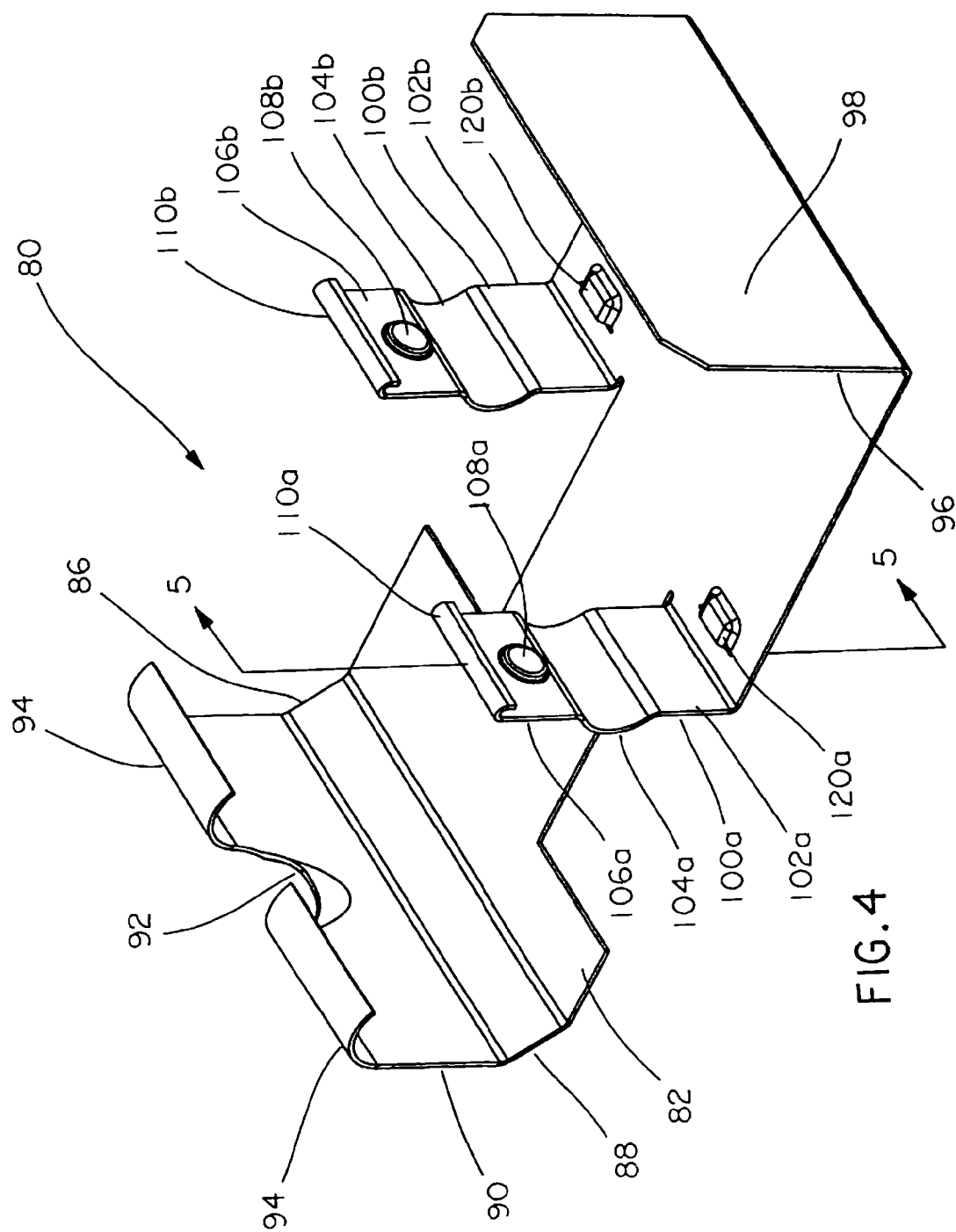
FIG. 4 is a perspective view of the divider clip of FIG. 1.
Figure 5:
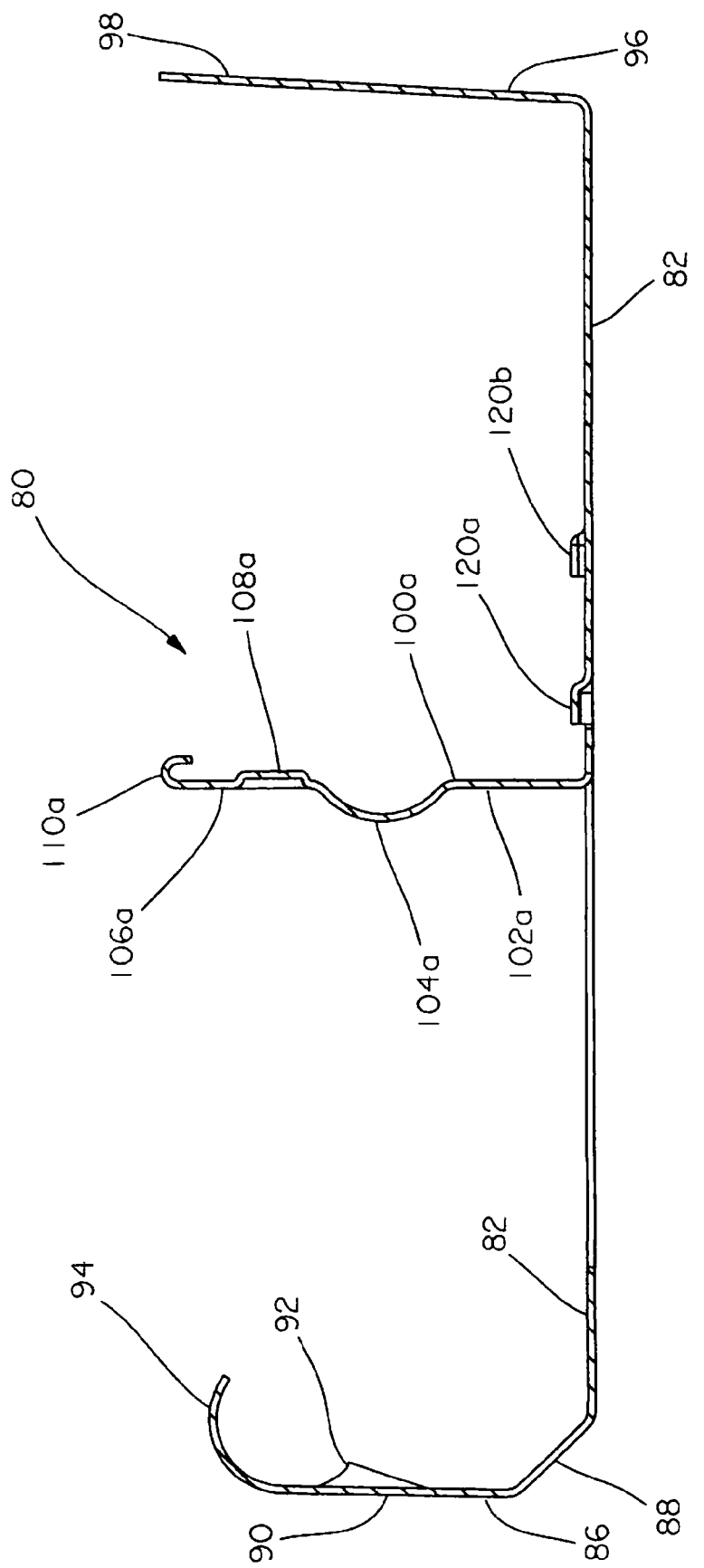
FIG. 5 is a cross sectional view of the divider clip of FIG. 4 taken along line 5-5.

FIGS. 4 and 5 illustrate the divider clip 80. The divider clip 80 is a single piece stamped metal component. The divider clip 80 includes a base 82 with a sidewall 86, 96 at each end of the base 82. The first sidewall 86 includes an inclined portion 88, a straight portion 90 with a slot 92 and curved portions 94. As described below, the inclined portion 88 of the first sidewall 86 enables the divider clip 80 to be installed in the multi-channel metal raceway 30. The slot 92 in the straight portion 90 is designed to receive a screwdriver, or other tool, to remove the divider clip 80 from the raceway 30. The second sidewall 96 includes a substantially perpendicular portion 98.

The divider clip 80 also includes two clip fingers 100a, 100b extending upwardly from the base 82 and two projections 120a, 120b extending upwardly from the base 82. One of the projections 120a, 120b is positioned adjacent to each clip finger 100a, 100b, respectively. The clip fingers 100a, 100b include a first straight portion 102a, 102b, a curved portion 104a, 104b, a second straight portion 106a, 106b and a hook portion 110a, 110b. The second straight portion 106a, 106b includes a projection 108a, 108b that engages the divider wall 50. One of the clip fingers 100a is located in the center of the divider clip 80 to hold the divider wall 50 so that it divides the raceway channel 48 into a 50/50 split. The second clip finger 100b is located off center closer to one of the divider clip sidewalls, preferably the second sidewall 96, to hold the divider wall 50 so that it divides the raceway channel 48 into a 60/40 split or a 40/60 split.

Figure 6:
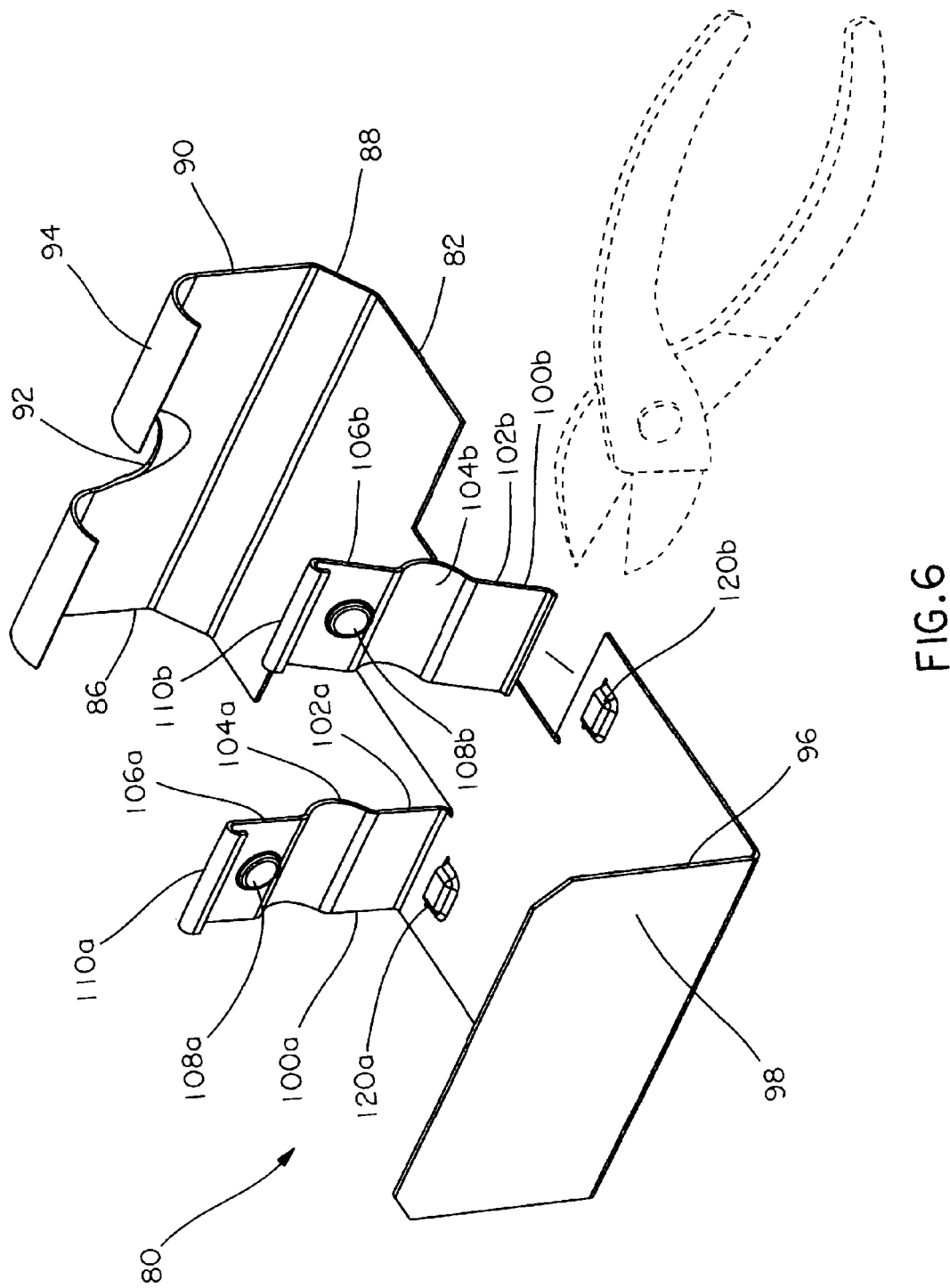
FIG. 6 is a perspective view of the divider clip of FIG. 4 with one of the clip fingers removed.

One of the clip fingers 100a, 100b may be cut from the divider clip 80 to provide the desired channel split in the raceway 30. As shown in FIG. 6, the off-center clip finger 100b has been cut from the divider clip 80 to provide a divider clip 80 that can hold a divider wall 50 to separate the raceway channel 48 into the 50/50 split illustrated in FIGS. 1-3 and FIG. 10. Alternatively, as illustrated in FIGS. 11 and 12, the clip finger 100a that is located at the center of the divider clip 80 may be cut off to enable the divider clip 80 to hold the divider wall 50 to separate the raceway channel 48 into a 60/40 split or a 40/60 split.

Figure 7:
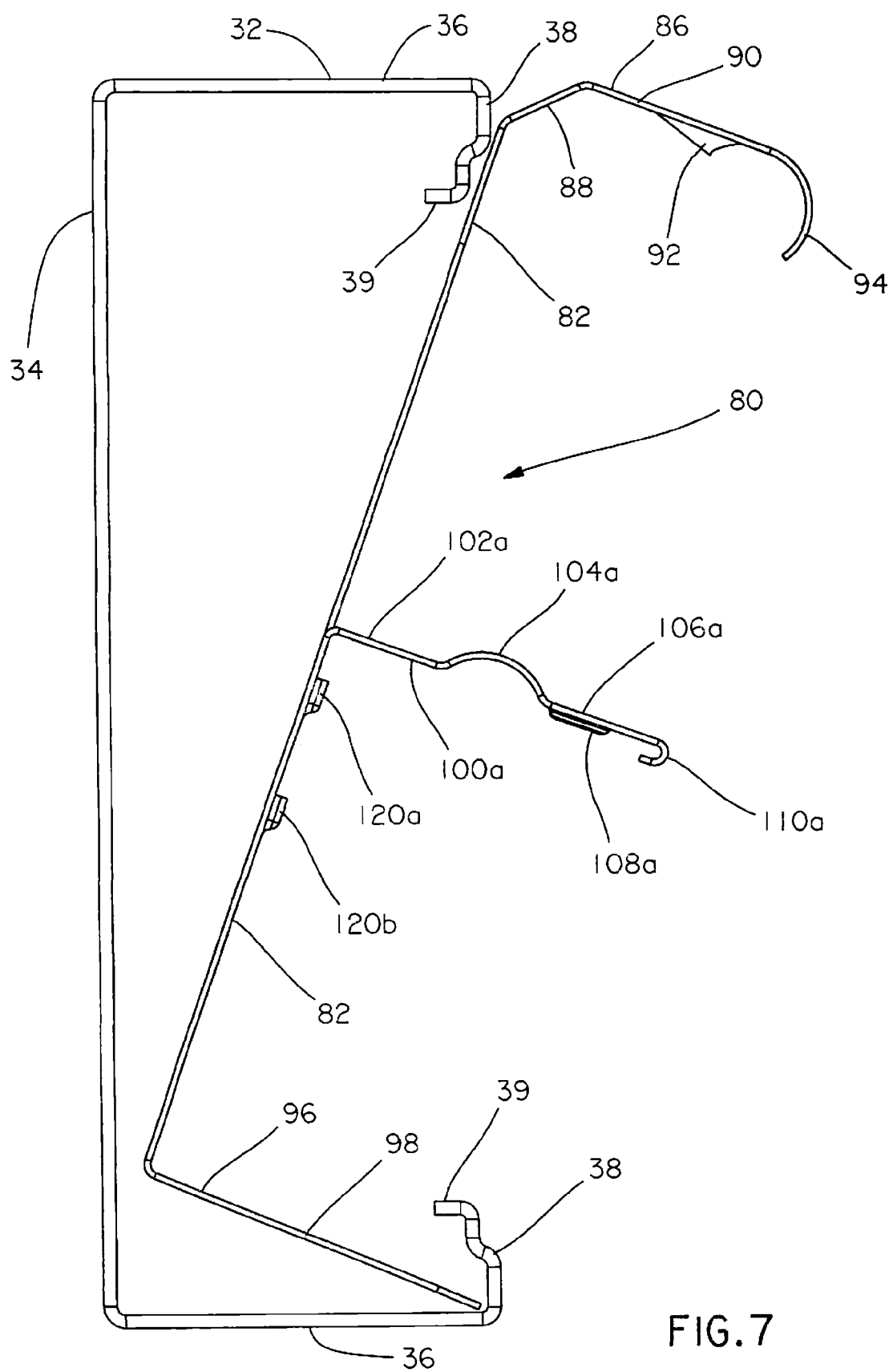
FIG. 7 is a side view of the multi-channel metal raceway system of FIG. 1 with the divider clip being installed.
Figure 8:
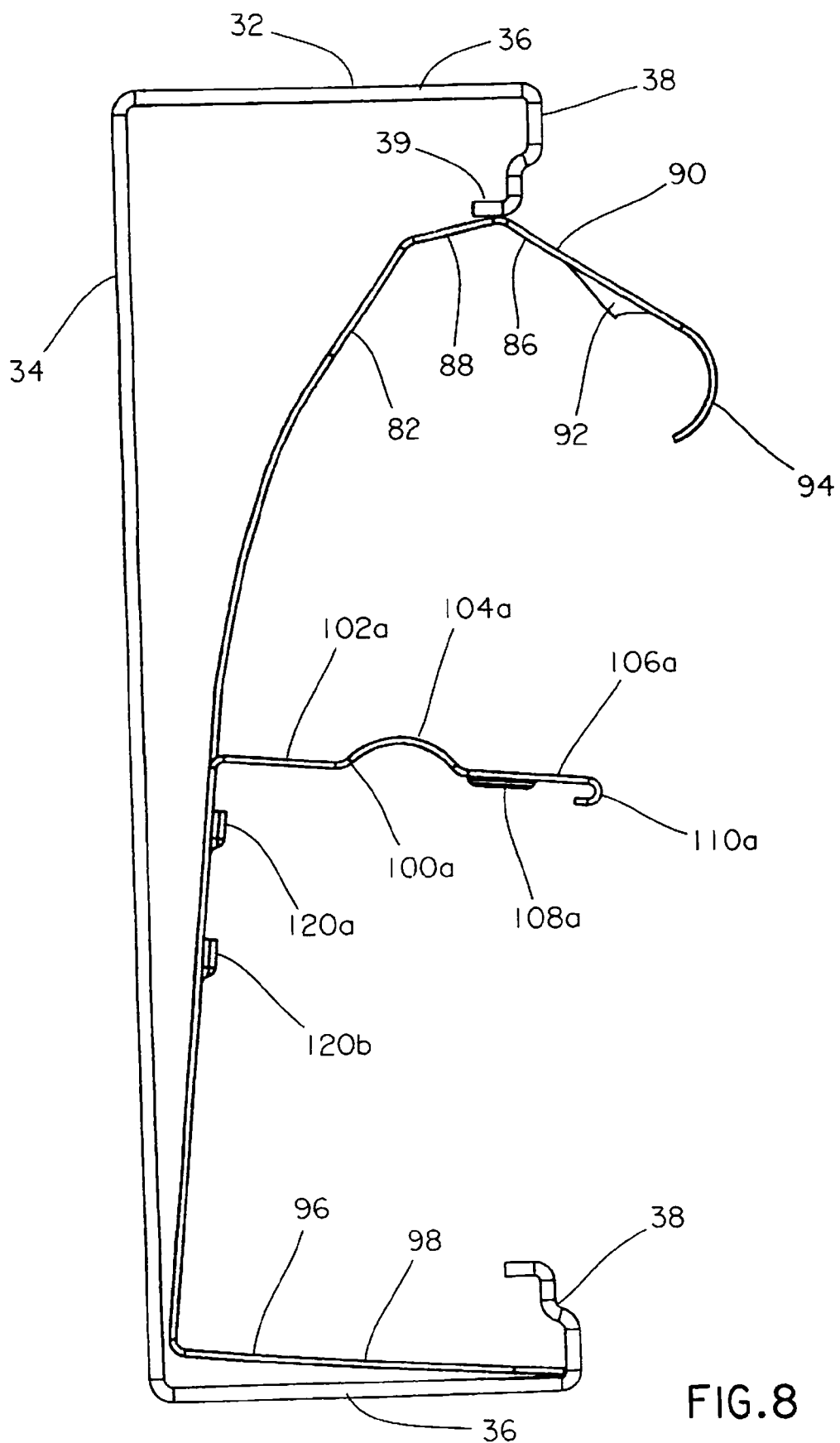
FIG. 8 is a side view of the multi-channel metal raceway system of FIG. 7 with the divider clip being installed.
Figure 9:
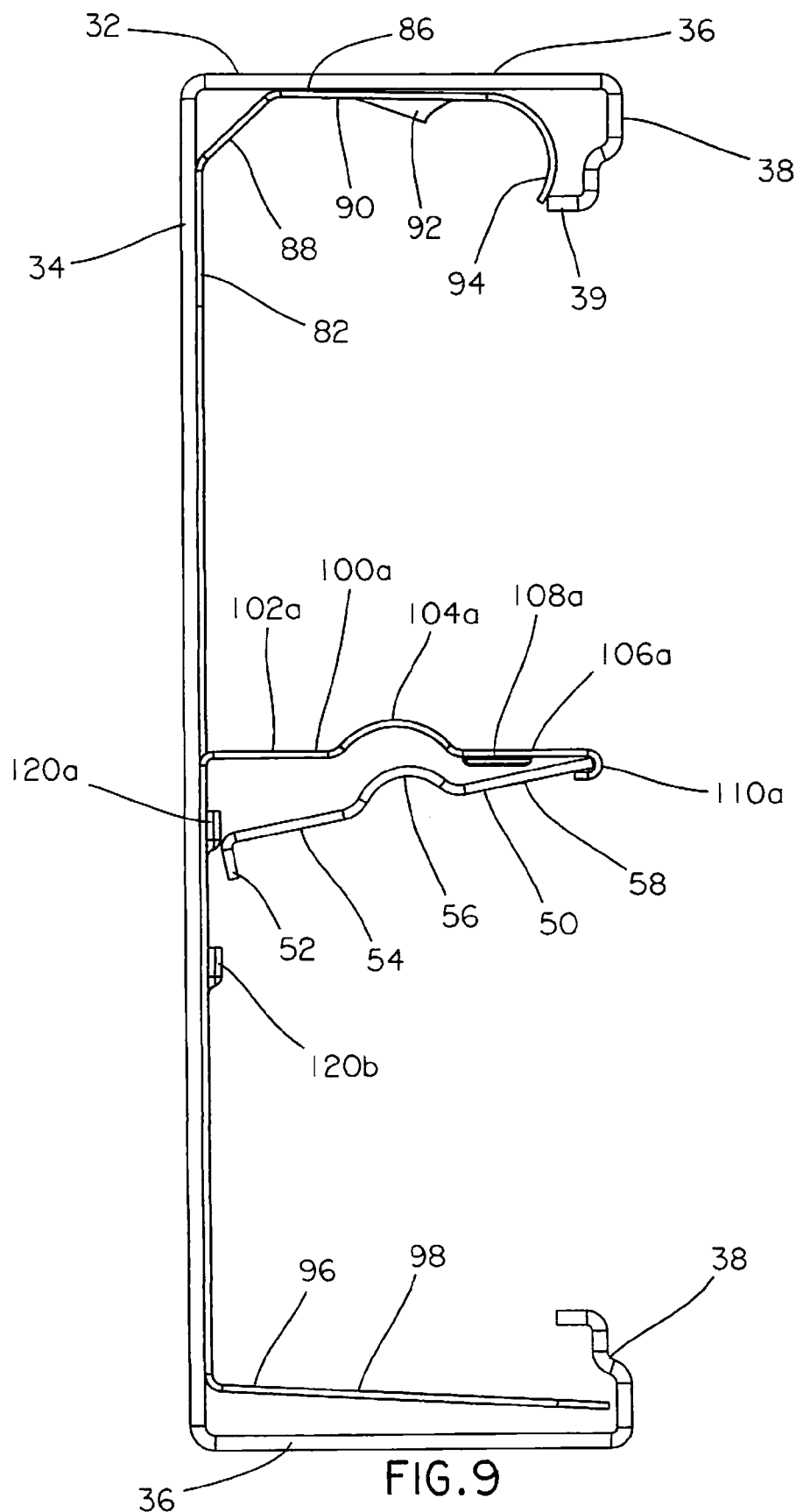
FIG. 9 is a side view of the multi-channel metal raceway system of FIG. 7 with the divider clip installed and a divider wall being installed.

FIGS. 7-9 illustrate the installation of the divider clip 80 and a divider wall 50 in the raceway base 32. Initially, the raceway base 32 is mounted to a wall, or other surface, via pan-head type screws. Before the divider clip 80 is installed in the raceway base 32, one of the clip fingers 100a, 100b is removed to provide the desired channel split. After the clip finger is removed, the second sidewall 96 with the substantially perpendicular portion 98 is inserted into the raceway base 32. The substantially perpendicular portion 98 of the second sidewall 96 is positioned adjacent to one of the sidewalls 36 of the raceway base 32. The first sidewall 86 of the divider clip 80 is then snapped into the raceway base 32. The inclined portion 88 of the first sidewall 86 contacts a portion of the flange 38 of the sidewall 36 of the raceway base 32 before the remainder of the first sidewall 86 of the divider clip 80 enters the raceway base 32. Once the divider clip 80 is installed, the curved portion 94 of the first sidewall 86 of the divider clip 80 contacts the downwardly extending portion 39 of the flange 38 of the sidewall 36 of the raceway base 32 (see FIG. 9). After the divider clip 80 is installed in the raceway base 32, the end of the divider wall 50 may be installed in the clip finger 100a, 100b of the divider clip 80.

The divider wall 50 includes a foot portion 52, a first straight portion 54, a curved portion 56 and a second straight portion 58. As illustrated in FIG. 9, to install the divider wall 50 in the divider clip 80, the second straight portion 58 is installed in the hook 110a, 110b of the clip finger 100a, 100b. The divider wall 50 is then snapped into place with the clip finger 100a, 100b matingly engaging the divider wall 50 and the foot portion 52 of the divider wall 50 positioned between the clip finger 100a, 100b and the projection 120a, 120b.

Figure 10:
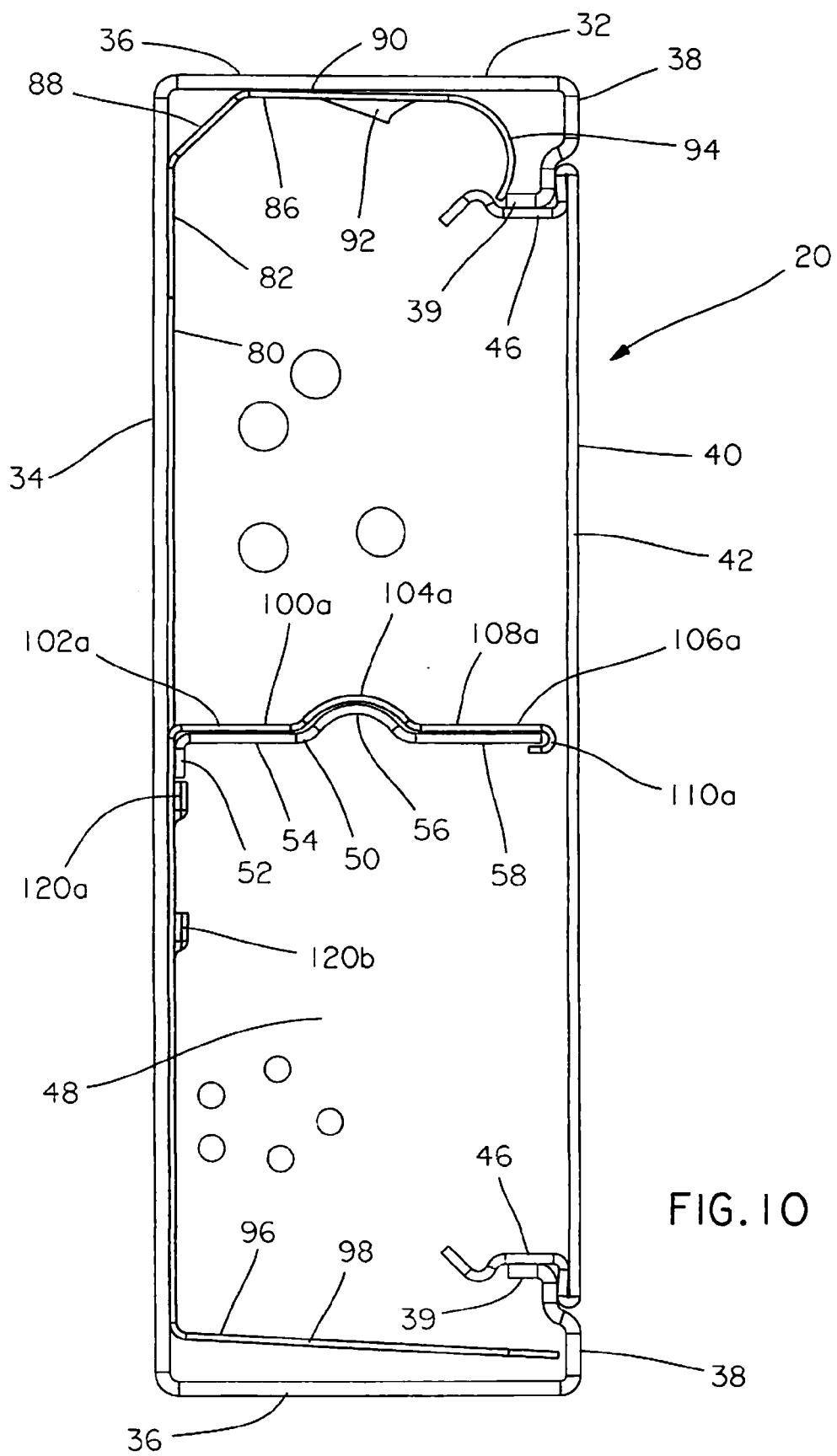
FIG. 10 is a side view of the multi-channel metal raceway system of FIG. 1 with the divider clip holding the divider wall to divide the raceway into a 50/50 split.
Figure 11:
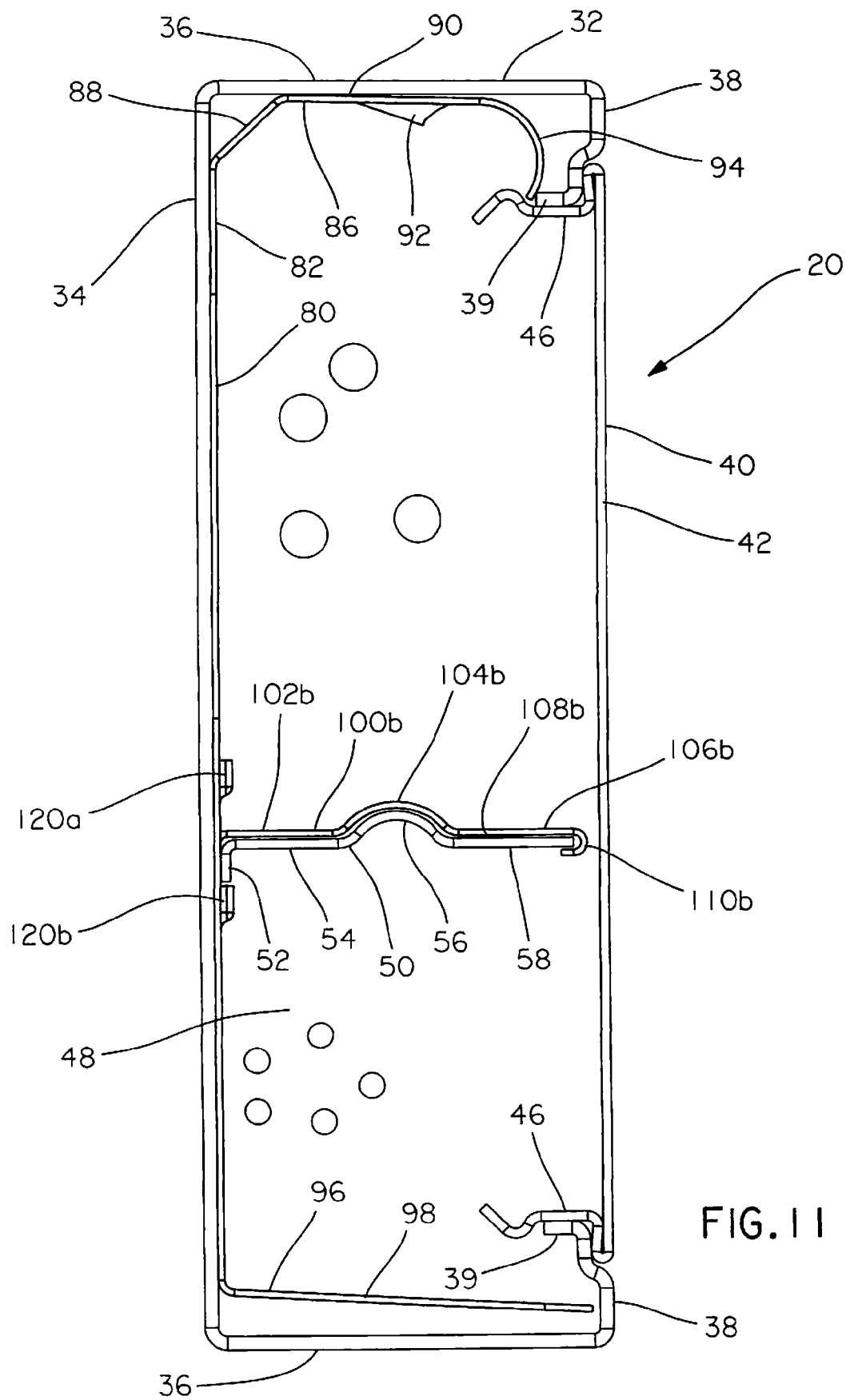
FIG. 11 is a side view of the multi-channel metal raceway system of FIG. 1 with the divider clip holding the divider wall to divide the raceway into a 60/40 split.
Figure 12:
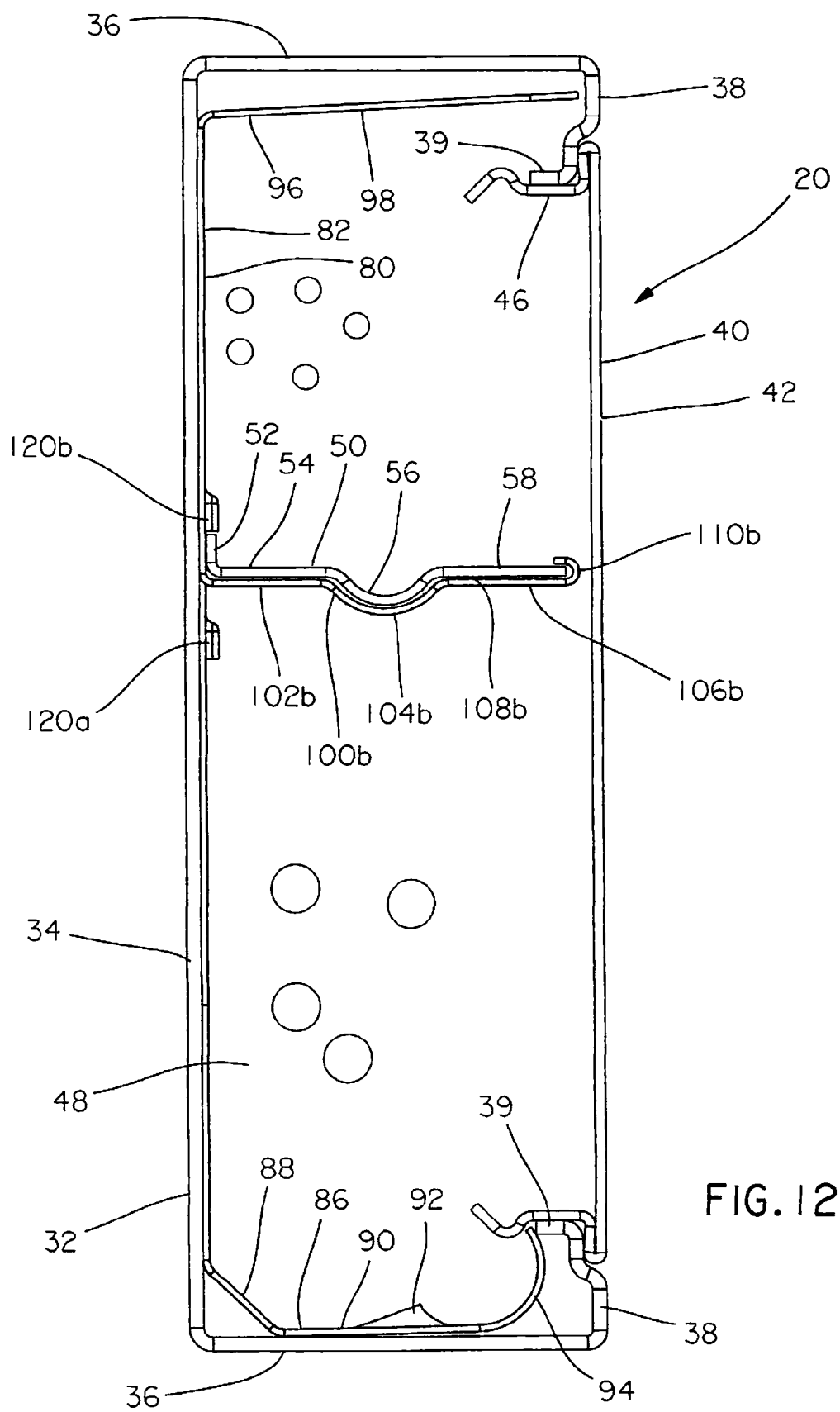
FIG. 12 is a side view of the multi-channel metal raceway system of FIG. 1 with the divider clip holding the divider wall to divide the raceway into a 40/60 split.

FIGS. 10-12 illustrate the multi-channel metal raceway system 20 with the divider clip 80 holding the divider wall 50 in one of three locations. FIG. 10 illustrates the multi-channel metal raceway 30 with the divider clip 80 holding the divider wall 50 to separate the raceway channel 48 into a 50/50 split. FIG. 11 illustrates the multi-channel metal raceway system 20 with the divider clip 80 holding the divider wall 50 to separate the raceway channel 48 into a 60/40 split. FIG. 12 illustrates the multi-channel metal raceway system 20 with the divider clip 80 rotated 180 degrees from the position illustrated in FIG. 11. In the rotated position, the divider clip 80 is positioned to hold the divider wall 50 to separate the raceway channel 48 into a 40/60 split.

Thus, the one-piece divider clip of the present invention is easy to install in a mounted raceway base to enable a divider wall to separate the raceway channel to the desired configuration for routing wires therein.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A divider clip for holding a divider wall in a multi-channel raceway, the divider clip comprising:
   a base;
   sidewalls extending from ends of the base; and
   at least two removable clip fingers extending from the base, wherein one of the removable clip fingers is located at the center of the base and one of the removable clip fingers is located closer to one of the sidewalls.

2. The divider clip of claim 1, wherein the divider clip is a single piece of stamped metal.

3. The divider clip of claim 1, wherein the clip fingers include a projection for engaging the divider wall.

4. The divider clip of claim 1, wherein the clip fingers include a first straight portion, a curved portion, a second straight portion and a hook portion.

5. The divider clip of claim 4, wherein the second straight portion includes a projection for engaging the divider wall.

6. The divider clip of claim 1, wherein one of the sidewalls includes an inclined portion, a straight portion and a curved portion.

7. The divider clip of claim 6, wherein the straight portion includes a slot for receiving a tool to aid in removal of the divider clip.

8. The divider clip of claim 1, wherein the clip finger located at the center of the base is removed for enabling the remaining clip finger to hold the divider wall to separate the raceway into a 60/40 channel split.

9. The divider clip of claim 1, wherein the clip finger located closer to one of the sidewalls is removed for enabling the remaining clip finger to hold the divider wall to separate the raceway into a 50/50 channel split.

10. The divider clip of claim 1, wherein one of the sidewalls includes a substantially perpendicular portion.

11. The divider clip of claim 1, wherein the base includes at least one projection positioned adjacent to one of the clip fingers for positioning the divider wall.

12. A multi-channel metal raceway system comprising:
   a raceway having a base and sidewalls;
   a divider wall positioned in the raceway; and
   a divider clip for holding the divider wall in the raceway, the divider clip includes a base, sidewalls extending from ends of the base, and removable clip fingers extending from the base, wherein one of the removable clip fingers is located at the center of the base and one of the removable clip fingers is located closer to one of the sidewalls.

13. The multi-channel metal raceway system of claim 12, wherein the divider clip is a single piece of stamped metal.

14. The multi-channel metal raceway system of claim 12, wherein the clip fingers include a projection for engaging the divider wall.

15. The multi-channel metal raceway system of claim 12, wherein the clip fingers include a first straight portion, a curved portion, a second straight portion and a hook portion.

16. The multi-channel metal raceway system of claim 12, wherein one of the sidewalls includes an inclined portion, a straight portion and a curved portion.

17. The multi-channel metal raceway of claim 12, wherein the clip finger located at the center of the base is removed for enabling the remaining clip finger to hold the divider wall to separate the raceway into a 60/40 channel split.

18. The multi-channel metal raceway of claim 12, wherein the clip finger located closer to one of the sidewalls is removed for enabling the remaining clip finger to hold the divider wall to separate the raceway into a 50/50 channel split.

19. The multi-channel metal raceway of claim 12, wherein the base includes at least one projection positioned adjacent to one of the clip fingers for positioning the divider wall.

20. The multi-channel raceway system of claim 12, wherein the divider wall includes a foot for supporting the divider wall in the raceway.

* * * * *